United States Patent [19]

Barkley et al.

[11] 4,063,843

[45] Dec. 20, 1977

[54] ADJUSTABLE BORING BAR

[75] Inventors: George G. Barkley, New Alexandria; John A. Cmar, Jr.; Howard J. McCreery, both of Latrobe, all of Pa.

[73] Assignee: Kennametal Inc., Latrobe, Pa.

[21] Appl. No.: 697,846

[22] Filed: June 21, 1976

[51] Int. Cl.² ............................................. B23B 29/12
[52] U.S. Cl. .................................... 408/146; 408/226
[58] Field of Search .................... 29/96; 408/226, 146, 408/231–233, 238–240, 185, 181; 279/9 A, 9 R

[56] References Cited

U.S. PATENT DOCUMENTS

| 2,089,930 | 8/1937 | Carlson | 279/9 A |
| 3,202,433 | 8/1965 | Davis | 408/146 |
| 3,316,615 | 5/1967 | Williams | 29/96 |
| 3,444,781 | 5/1969 | Sunderman et al. | 279/9 R |

Primary Examiner—Leonidas Vlachos
Attorney, Agent, or Firm—Lawrence R. Burns

[57] ABSTRACT

A shank for an adjustable boring bar is disclosed herein having first and second members telescopically engaged in a nonrotatable relation from one to the other with one of the members having mounted thereon an axially adjustable abutment means such that rotation of the abutment means on one member provides relative axial movement between the first and second members. A recess is shown formed on the outer surface of the innermost telescopically engaged member, the recess having a declining surface in the direction of the abutment means such that a clamp element located and engaged in the outermost telescopically engaged member is operable downwardly to engage said declining surface and hold the first and second members in a firm abutting relationship.

5 Claims, 6 Drawing Figures

ADJUSTABLE BORING BAR

BACKGROUND OF THE INVENTION

Boring bars that are used with numerically controlled tape machines are of the detachable nature having an insert holding portion on one end and a collar type attachment on the other such that the boring bars may be attached to turrets and the like and used upon a tape controlled cutting machine. The tape controlled cutting machine usually has a referenced datum dimension when measured from some control point on the tape controlled machine spindle to the end point where the cutting insert will perform upon the workpiece.

When using boring bars, usually, the head of the boring bar, itself, is a replaceable item such that different cutting configurations and cutting tools may be interchanged on the boring bar to provide the desired end result on the workpiece. Besides the head being interchangeable, the boring bars also use cemented hard metal carbide inserts which are, themselves, indexable and, also, interchangeable such that inserts, themselves, may be changed at some point during the cutting operation when the cutting insert becomes dull.

It is desirable that, if either the head of the boring bar, the insert on the boring bar or the tooling configuration on the end of the boring bar is changed, that the referenced datum dimension referred to above can be compensated for on the boring bar tool, itself, rather than reprogramming the dimension that has been set on the tape.

It is, therefore, desirable when constructing a boring bar having an axially adjustable feature on it to insure that the boring bar as a whole remains as rigid as possible while, also, trying to insure that the construction of the boring bar is economically feasible.

Other constructions of such axial adjustment mechanisms are described and claimed in U.S. Pat. application Ser. No. 675,322, filed Apr. 9, 1976, assigned to Kennametal Inc., and U.S. Pat. No. 3,911,542, which is also assigned to Kennametal Inc.

It is an object of the present invention to provide a shank for a boring bar whose axial length is adjustable and yet is of a rigid and economical construction.

BRIEF SUMMARY OF THE INVENTION

According to the present invention, a shank for a boring bar is described which comprises first and second members having end portions telescopically engaged with each other with said first and second members being held in nonrotatable relationship relative to each other. An axial adjustable abutment ring is mounted on one of said first and second members, such as by thread means, with the ring having an abutment face to abut a portion of the member other than which it is mounted. Rotation of the abutment ring advances the ring axially along the length of the member upon which it is mounted and provides a locating stop for the member against which the face of the abutment ring abuts.

The member upon which the abutment ring is mounted preferably has the innermost telescopically engaged portion and a recess is formed in the outer surface of the innermost telescopically engaged member such that the recess has a declining surface in the direction of the abutment ring. A clamp element, preferably, a threaded cone point set screw, is mounted in the outermost telescopically engaged member and is operable to be moved radially inward so that it engages the declining surface and urges one of said first and second members into firm abutment with the abutment ring.

Means for holding said first and second members in a nonrotatable relationship of one to the other is disclosed comprising various configurations comprising a pin element engaged with the outer and inner telescopically engaged members such that the inner telescopically engaged member is slidable axially inside the outer member with the pin element engaged between the two members holding the two members nonrotatable relative to each other.

The exact nature of the present invention will become more clearly apparent upon reference to the following detailed specification taken in connection with the accompanying drawings in which.

DETAILED DESCRIPTION OF THE INVENTION

Figure 1:
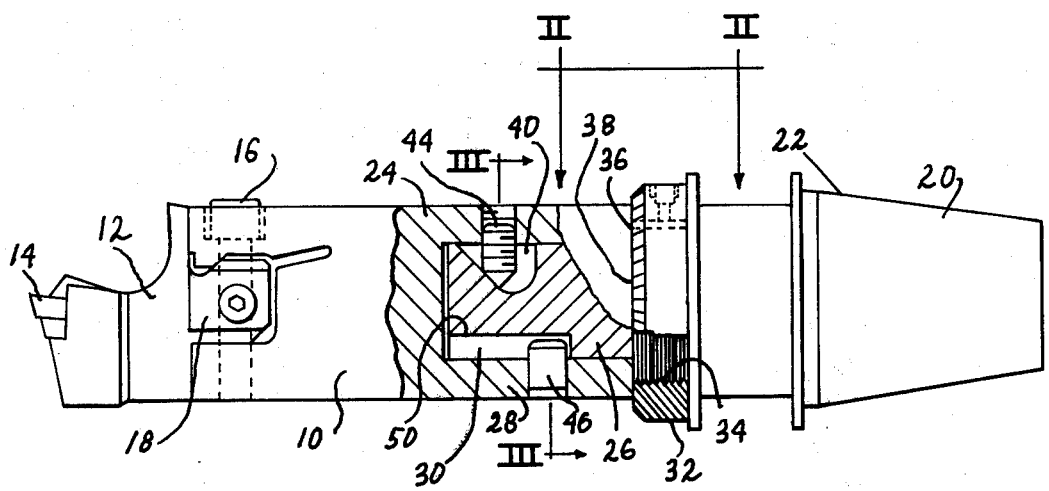
FIG. 1 is a partially cut-away side view of a boring bar according to the present invention.

Referring to the drawings somewhat more in detail, in FIG. 1 is shown a boring bar 10 having on one end a detachable head element 12 having a portion thereon for seating a cutting insert 14. The detachable cutting head 12 is held on the bar by bolt 16 which extends downward through the body of the bar 10 and also an extension 18 of the detachable head 12. This type of connection has been found to be very satisfactory and is further described in applicants own U.S. Pat. Nos. 3,704,958, 3,765,788, 3,801,213 and 3,856,428, assigned to Kennametal Inc.

On the opposite end of the boring bar 10 from the detachable head 12 is a spindle adaptor 20 which is adapted for attachment to a machining center, such as a turret and the like, usually found on numerically controlled tape machines. Part of the spindle adaptor 20 is formed by a tapered diameter 22 which will abut into the turret as mentioned above and provide a reference point from the abutment diameter to the foremost edge of the cutting insert 14. This reference dimension is programmed into the tape of the computer operated machine such that precise and accurate cutting tolerances may be maintained.

As has been mentioned above, the boring bar 10 has a detachable cutting head 12 and also a removable cutting insert 14 such that, when either one or both have been replaced, the referenced dimension from tapered diameter 22 to the cutting point of cutting insert 14 may be changed somewhat, and it is, therefore, preferable to have an adjustment mechanism in the body of the boring bar 10 such that the operator may reset the cutting point of cutting insert 14 to the known referenced dimension on the tape.

Shown in FIG. 1 is boring bar 10 having a first member 20 and a second member 24, respectively, having telescopically engaged end portions 26 and 28. End portion 26 of first member 20 forms the innermost telescopically engaged portion and is preferably cylindrical in cross section and has a close sliding fit inside bore 30 formed in end portion 28 of second member 24. An abutment ring 32 is mounted on first member 20, preferably by thread means 34, such that, when abutment ring 32 is rotated, it may advance or retreat along the axial length of the first member 20.

Abutment ring 32 has a face 36 which faces the end portion 28 of second member 24 and abuts with the corresponding face 38 on the end portion 28. The innermost telescopically engaged end portion 26 has a recess 40 formed in its outer periphery such that there is a declining surface 42 which declines in a direction toward the abutment ring 32.

A clamp screw 44 is threadedly engaged through the end portion 28 such that it is operable upon rotation to advance radially inwardly and engage the declining surface 42 of end portion 26 so that the abutting faces 38 of first member 24 and the abutment surface 36 of abutment ring 32 are urged into a solid rigid contact. Threaded clamp member 44, of course, is only operated into engagement with declining surface 42 when the abutment ring 32 has been set at the predetermined axial location.

First member 20 and second member 24 of boring bar 10 are held in a nonrotatable relation one to the other by engagement with dowel pin 46. Dowel pin 46 is press fitted into a hole 48 formed in end portion 28 and extends upwardly into a longitudinal groove 50 which is formed in end portion 26 of first member 20. Dowel pin 46 thus allows first member 20 and second member 24 to have axial movement relative to one another while also preventing rotational movement from one to the other.

Figure 2:
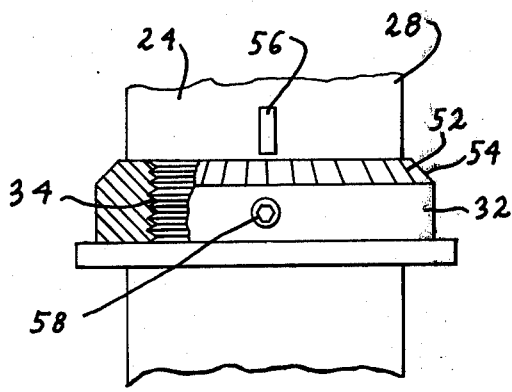
FIG. 2 is a view through section II—II of FIG. 1.

With reference to FIG. 2, what is shown therein is a view II—II through FIG. 1. Looking through section II—II of FIG. 1, what is shown therein is the first member 20 of boring bar 10 having mounted thereon the adjustable abutment ring 32. The adjustable abutment ring 32 is mounted on the first member 20 by threaded means 34 such that rotation of the ring 32 will move it axially along the length of the first member 20 depending on the direction of rotation chosen.

Calibrated markings 52 are shown on surface 54 of ring 32. Surface 54 of ring 32 is frusto-conically shaped with respect to the main body of ring 32 such that the surface recesses inwardly to mate with an indicator marked 56 which is located upon the end portion 28 of a second member 24. The calibrated markings 52 are correlated with the pitch of the threads 54 such that a division between each markings 52 represents an axial movement of ring 32 along first member 20 designated in thousandths of an inch.

Once the dimension has been set by adjustment of the ring 32, a clamp screw 58 may be adjusted downwardly through ring 32 so as to firmly engage the threads 34 and hold the ring 32 nonrotatable with first member 20.

Figure 3:
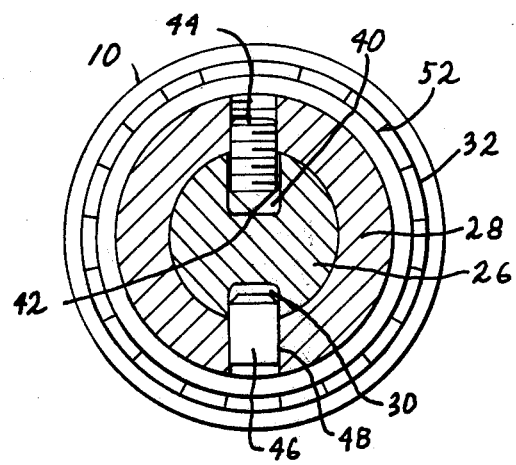
FIG. 3 is a view through section III—III of FIG. 1.

Referring now to FIG. 3, what is shown therein is a boring bar 10 with end portions 28 and 26 telescopically engaged and having an extremely close sliding fit as shown in FIG. 3. Ring member 32 is shown mounted on first member 20 and having its calibrated markings 52 showing markings completely around a side face of the ring member 32. Clamp member 44 is shown in its clamped position down in the recess 40 and on the declining surface 42 such that the second member 24 is urged into abutment with the abutment ring 32.

Groove 30 can be seen more clearly in FIG. 3 as it engages the dowel pin member 46 which, in turn, has a press fit with the hole 48. The groove 30 and end portion 26 which engage the dowel pin 46 located in hole 48 of the second end portion 28 allows first member 20 and second member 24 to have relative axial movement with one another while being prevented from having a rotational movement relative to one another.

Figure 4:
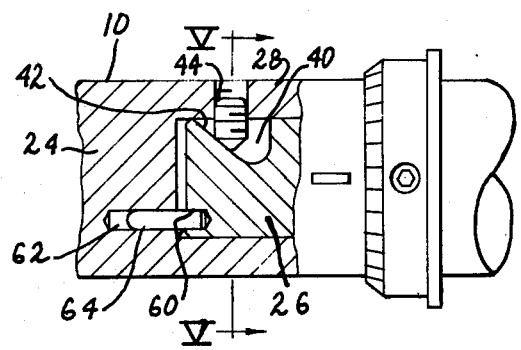
FIG. 4 is a modification of the arrangement shown in FIG. 1.

With reference to FIG. 4, what is shown therein is again the boring bar 10 having telescopically engaged end portions 26 and 28 with the same arrangement of clamp screw 44 in recess 40 as has been described above. Shown in FIG. 4, however, is a modified arrangement of a structure to prevent relative rotational movement between end portions 26 and 28 while allowing relative axial movement between first member 20 and second member 24.

Shown in FIG. 4 is a longitudinal bore 60 formed extending inwardly of end portion 26 and, similarly, a longitudinal bore 62 is formed extending inwardly from bore 30 and second member 24. A pin member 64 is engaged between longitudinal bores 60 and 62 such that relative axial movement can be had between first member 20 and second member 24 while relative rotational movement is provided.

Pin member 64 may be press fitted in either of longitudinal bores 60 or 62 as long as the other bore 60 or 62 is provided with some clearance for the pin to slide therein.

Figure 5:
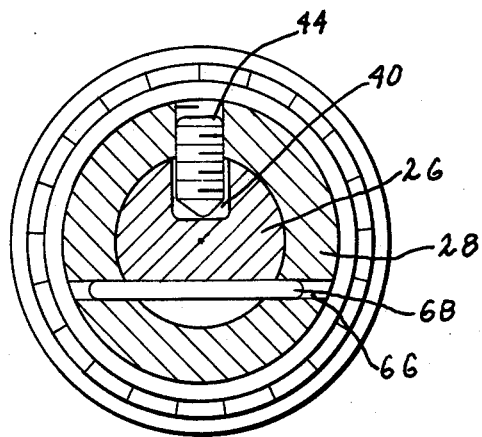
FIG. 5 is a further modification of the arrangement shown in FIG. 1.

What is shown in FIG. 5 is again end portions 26 and 28 having the same clamp screw 44 in recess 40 as has been described above. However, a third construction for holding the first and second members nonrotational relative to one another is shown therein. In FIG. 5, a transverse hole 66 is formed through end portion 28 such that another pin member 68 is press fitted into transverse hole 66.

End portion 26 now has been formed such that a longitudinal flat may be located along one side thereof such that it engages the pin member 68 and is thereby held in a nonrotative relationship with end portion 28. The flat, itself, being longitudinal, allows axial motion between end portions 26 and 28.

Figure 6:
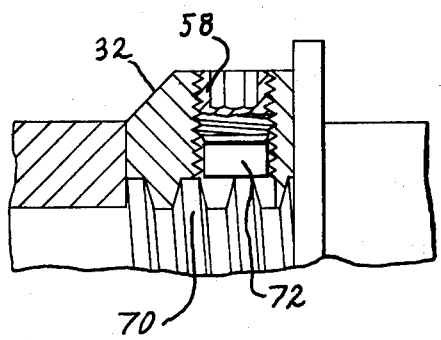
FIG. 6 is a modification of the adjustable abutment ring shown in FIG. 2.

Referring now to FIG. 6, what is shown therein is a more detailed view of the clamp screw 58 having a threaded connection with ring member 32. Also shown herein is ring member 32 having a modified threaded engagement 70 with the first member 20 wherein the crown of the threads terminate in flats which is much more aptly described as acme threads. An advantage of the acme threads over any other threading arrangement is that, when clamp screw 58 is operated radially inwardly to engage said threads 70, the threads will not be damaged by such clamping action.

Preferably, just beneath clamp hole 58, a plastic member 72 may be interposed between the clamp bolt 58 and the thread 70 such that thread 70 will not be damaged if clamp screw 58 is overtorqued during operation.

Modifications may be made within the scope of the appended claims.

What is claimed is:

1. A shank for a boring bar comprising; first and second members having end portions telescopically engaged, one of said first and second members having an opposite end for supporting a cutting insert and having its end portion telescopically engaged over the other of said first and second members, means for holding said first and second members nonrotatable relative to each other, axially adjustable abutment means interengaged between said first and second members operable to axially move one member relative to the other, a recess formed on the outer face of the innermost telescopically engaged end portion, said recess having a declining surface in the direction of said axially adjustable abutment means, a clamp element located and engaged in said outermost telescopically engaged end portion, said clamp element operable to be moved radially inward and engage said declining surface so that one of said first and second members is held firmly against said abutment means.

2. A shank for a boring bar according to claim 1 in which said abutment means comprises a ring threadedly engaged with one of said first and second members, said ring having a side facing the other member of said one of said first and second members, said side forming an abutment surface for said other member.

3. A shank for a boring bar according to claim 1 in which said means for holding said first and second members nonrotative relative to each other comprises a longitudinal slot formed in the outer surface of the innermost telescopically engaged end portion, a radially extending dowel pin engaging said slot and said outermost telescopically engaged end portion.

4. A shank for a boring bar according to claim 1 in which said means for holding said first and second members nonrotative relative to each other comprises a longitudinal perforation formed in the innermost telescopically engaged end portion, a longitudinally extending dowel pin engaging said perforation and the other member of said first and second members.

5. A shank for a boring bar according to claim 1 in which said means for holding said first and second members nonrotative relative to each other comprises a recess on said innermost telescopically engaged member forms a flat, a transverse perforation formed in said outer telescopically engaged member, a pin element extending through said perforation and engaging said flat and said outer member.

* * * * *